United States Patent
Rambo et al.

(10) Patent No.: US 11,434,824 B2
(45) Date of Patent: Sep. 6, 2022

(54) FUEL HEATER AND ENERGY CONVERSION SYSTEM

(71) Applicant: General Electric Company, Schenectady, NY (US)

(72) Inventors: Jeffrey Douglas Rambo, Mason, OH (US); Gregory Michael Petrasko, Hamilton, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/166,245

(22) Filed: Feb. 3, 2021

(65) Prior Publication Data

US 2022/0243660 A1    Aug. 4, 2022

(51) Int. Cl.
*F02C 7/224* (2006.01)
*F02C 7/32* (2006.01)
(Continued)

(52) U.S. Cl.
CPC .............. *F02C 7/224* (2013.01); *B64D 37/34* (2013.01); *F02C 7/141* (2013.01); *F02C 7/16* (2013.01);
(Continued)

(58) Field of Classification Search
CPC .......... F05D 2260/85; F05D 2260/213; F05D 2260/232; F05D 2260/4031;
(Continued)

(56) References Cited

U.S. PATENT DOCUMENTS

| 2,582,842 A | 1/1952 | Messinger |
| 2,720,313 A | 10/1955 | Pattison |

(Continued)

FOREIGN PATENT DOCUMENTS

| EP | 2003311 A2 | 12/2008 |
| EP | 3018304 A1 | 5/2016 |

(Continued)

OTHER PUBLICATIONS

Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php.

*Primary Examiner* — Todd E Manahan
*Assistant Examiner* — David P. Olynick
(74) *Attorney, Agent, or Firm* — Dority & Manning, P.A.

(57) ABSTRACT

A system for energy conversion is provided including a propulsion system, a fuel circuit, a combustion device and turbine separate from the propulsion system, and a load device. A fuel flow control device separates a flow of fuel from the fuel tank into a first portion of fuel and a second portion of fuel. A fuel circuit is configured to provide the first portion of fuel to a heat addition system at the propulsion system. A combustion device receives a flow of oxidizer from a compressor section of the propulsion system via a fluid circuit. The fuel circuit provides the second portion of fuel to the combustion device. The fluid circuit flows combustion gases to the turbine and the propulsion system. The load device is operably coupled to the turbine to receive an output torque via expansion of the combustion gases through the turbine.

12 Claims, 6 Drawing Sheets

(51) Int. Cl.
*F02C 7/141* (2006.01)
*F02C 7/16* (2006.01)
*F02C 9/22* (2006.01)
*B64D 37/34* (2006.01)

(52) U.S. Cl.
CPC .............. *F02C 7/32* (2013.01); *F02C 9/22* (2013.01); *F05D 2220/323* (2013.01); *F05D 2240/128* (2013.01); *F05D 2260/213* (2013.01); *F05D 2260/232* (2013.01); *F05D 2260/4031* (2013.01); *F05D 2260/606* (2013.01); *F05D 2260/85* (2013.01)

(58) Field of Classification Search
CPC ........... F05D 2240/128; F05D 2220/50; F05D 2220/323; F02C 9/22; F02C 7/14; F02C 7/16; F02C 7/26; F02C 7/32; F02C 7/141; F02C 7/185; F02C 7/224; F02C 7/228; F02C 7/268; F02C 7/277; F02C 6/08; F02C 3/34; F02C 6/10; B64D 37/34
See application file for complete search history.

(56) References Cited

U.S. PATENT DOCUMENTS

| | | |
|---|---|---|
| 2,893,628 A | 7/1959 | Herman |
| 3,050,240 A | 8/1962 | Darnell |
| 3,178,105 A | 4/1965 | Darnell |
| 3,522,008 A | 7/1970 | Defabaugh et al. |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,138,856 A | 2/1979 | Orlowski |
| 4,169,567 A | 10/1979 | Tamura |
| 4,170,116 A | 10/1979 | Williams |
| 4,199,975 A | 4/1980 | Schrock et al. |
| 4,449,372 A | 5/1984 | Rilett |
| 4,466,481 A | 8/1984 | Wilson et al. |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 4,936,097 A | 6/1990 | Rodgers |
| 5,149,018 A | 9/1992 | Clark |
| 5,267,608 A | 12/1993 | Coffinberry |
| 5,341,636 A | 8/1994 | Paul |
| 5,363,641 A * | 11/1994 | Dixon ................. F02C 6/08 60/788 |
| 5,414,992 A * | 5/1995 | Glickstein ............... F02C 7/224 60/39.83 |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,834,632 A | 11/1998 | Olender et al. |
| 5,904,836 A | 5/1999 | Lee et al. |
| 6,106,229 A | 8/2000 | Nikkanen et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,305,156 B1 | 10/2001 | Lui |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,478,525 B2 | 1/2009 | Iya et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,810,332 B2 | 10/2010 | Olmes et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,886,580 B2 | 2/2011 | Kumar et al. |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,261,593 B1 | 9/2012 | Sanders |
| 8,291,748 B2 | 10/2012 | Kumar et al. |
| 8,388,830 B2 | 3/2013 | Sohn et al. |
| 8,424,280 B2 | 4/2013 | Moore et al. |
| 8,424,285 B2 | 4/2013 | Veilleux, Jr. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,591,102 B2 | 11/2013 | Frach et al. |
| 8,602,362 B2 | 12/2013 | Buchwald |
| 8,663,996 B2 | 3/2014 | Beeson |
| 8,747,055 B2 | 6/2014 | McCune et al. |
| 8,765,070 B2 | 7/2014 | Norton et al. |
| 8,776,866 B2 | 7/2014 | Cederberg et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,114,877 B2 | 8/2015 | Weber et al. |
| 9,120,580 B2 | 9/2015 | Sampath |
| 9,144,768 B2 | 9/2015 | Tichborne et al. |
| 9,162,162 B2 | 10/2015 | Yount |
| 9,200,855 B2 | 12/2015 | Kington et al. |
| 9,222,415 B2 | 12/2015 | Osorio |
| 9,231,267 B2 | 1/2016 | McAlister |
| 9,284,057 B2 | 3/2016 | Kelhofer |
| 9,328,661 B2 | 5/2016 | Ho et al. |
| 9,328,978 B2 | 5/2016 | Appukuttan et al. |
| 9,410,482 B2 | 8/2016 | Krautheim et al. |
| 9,429,072 B2 | 8/2016 | Diaz et al. |
| 9,435,246 B2 | 9/2016 | Devarakonda |
| 9,458,764 B2 | 10/2016 | Alecu et al. |
| 9,474,186 B2 | 10/2016 | Campbell et al. |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,739,546 B2 | 8/2017 | Bertilsson et al. |
| 9,752,507 B2 | 9/2017 | Selstad et al. |
| 9,771,867 B2 | 9/2017 | Karam et al. |
| 9,829,259 B2 | 11/2017 | Nyander et al. |
| 9,834,315 B2 | 12/2017 | Lo et al. |

(56) References Cited

U.S. PATENT DOCUMENTS

| | | | |
|---|---|---|---|
| 9,863,322 B2 | 1/2018 | Williams et al. | |
| 9,885,290 B2 | 2/2018 | Della-Fera et al. | |
| 9,897,054 B2 | 2/2018 | Lo et al. | |
| 10,041,407 B2 | 8/2018 | Nenmeni et al. | |
| 10,059,460 B2 | 8/2018 | Dauriac et al. | |
| 10,260,419 B2 | 4/2019 | Cerny et al. | |
| 2009/0133380 A1 | 5/2009 | Donnerhack | |
| 2009/0158739 A1 | 6/2009 | Messmer | |
| 2009/0188234 A1 | 7/2009 | Suciu et al. | |
| 2010/0212857 A1* | 8/2010 | Bulin | F02C 7/224 165/41 |
| 2010/0313591 A1 | 12/2010 | Lents et al. | |
| 2011/0000227 A1 | 1/2011 | Kamiya | |
| 2011/0262309 A1 | 10/2011 | Limaye et al. | |
| 2012/0048509 A1 | 3/2012 | Weber et al. | |
| 2012/0111095 A1 | 5/2012 | Sheehan | |
| 2012/0216502 A1 | 8/2012 | Freund et al. | |
| 2012/0216677 A1 | 8/2012 | Koenig et al. | |
| 2013/0186100 A1 | 7/2013 | Rhoden et al. | |
| 2014/0000275 A1 | 1/2014 | Kesseli et al. | |
| 2014/0165570 A1 | 6/2014 | Herring | |
| 2014/0205446 A1 | 7/2014 | Patsouris et al. | |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0072850 A1 | 3/2015 | Derrick et al. | |
| 2015/0114611 A1 | 4/2015 | Morris et al. | |
| 2015/0159867 A1 | 6/2015 | Patrick et al. | |
| 2015/0192036 A1 | 7/2015 | Sharp et al. | |
| 2016/0003160 A1 | 1/2016 | Hagshenas | |
| 2016/0096629 A1 | 4/2016 | Vaisman | |
| 2016/0108814 A1 | 4/2016 | Schmitz | |
| 2016/0013103 A1 | 5/2016 | Bintz et al. | |
| 2016/0138431 A1 | 5/2016 | Lear, Jr. | |
| 2016/0167802 A1 | 6/2016 | Lo et al. | |
| 2016/0208759 A1 | 7/2016 | Lo et al. | |
| 2016/0245144 A1 | 8/2016 | Selberg et al. | |
| 2016/0290214 A1 | 10/2016 | Ekanayake et al. | |
| 2016/0298547 A1 | 10/2016 | Ripley et al. | |
| 2016/0305440 A1 | 10/2016 | Laboda et al. | |
| 2016/0341126 A1 | 11/2016 | Kupratis et al. | |
| 2016/0369700 A1 | 12/2016 | Ribarov et al. | |
| 2017/0030266 A1* | 2/2017 | Cerny | F02C 7/185 |
| 2017/0044984 A1 | 2/2017 | Pesyna et al. | |
| 2017/0096910 A1 | 4/2017 | Raimarckers et al. | |
| 2017/0113807 A1 | 4/2017 | Burnell et al. | |
| 2017/0114721 A1 | 4/2017 | Miller et al. | |
| 2017/0141419 A1 | 5/2017 | Wu et al. | |
| 2017/0159566 A1 | 6/2017 | Sennoun et al. | |
| 2017/0167382 A1 | 6/2017 | Miller et al. | |
| 2017/0184027 A1 | 6/2017 | Moniz et al. | |
| 2017/0291714 A1 | 10/2017 | Corman | |
| 2018/0016025 A1 | 1/2018 | Rheaume et al. | |
| 2018/0056233 A1 | 3/2018 | Henson et al. | |
| 2018/0056234 A1 | 3/2018 | Weng et al. | |
| 2018/0071659 A1 | 3/2018 | Rhoden | |
| 2018/0118367 A1 | 5/2018 | Rheaume et al. | |
| 2019/0153952 A1 | 5/2019 | Niergarth et al. | |
| 2019/0153953 A1 | 5/2019 | Niergarth et al. | |
| 2019/0218971 A1 | 7/2019 | Niergarth et al. | |
| 2019/0257247 A1* | 8/2019 | Pal | F02C 3/04 |
| 2020/0040848 A1* | 2/2020 | Hanrahan | F02K 3/077 |

FOREIGN PATENT DOCUMENTS

| | | |
|---|---|---|
| EP | 3075957 A1 | 10/2016 |
| GB | 2034822 A | 6/1980 |
| GB | 2136880 A | 9/1984 |
| GB | 2204361 A | 11/1988 |
| JP | S5932893 U | 2/1984 |
| JP | 2001317371 A | 11/2001 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |
| WO | WO2015105552 A1 | 7/2015 |

\* cited by examiner

FUEL HEATER AND ENERGY CONVERSION SYSTEM

FIELD

The present subject matter relates generally to systems for energy conversion and systems for thermal management for propulsion systems and vehicles. The present subject matter relates to thermal management and energy conversion systems for aircraft and propulsion systems.

BACKGROUND

Propulsion systems, such gas turbine engines, are challenged with thermal management of increasingly higher thermal loads and energy conversion. The increasingly higher thermal loads and energy requirements are due to increasing electrification of propulsion systems and vehicles such as aircraft, greater electric loads, and the need for improved thermal efficiency at fuel systems, oil systems, and cooling fluids.

Conventional systems that generate auxiliary power to meet increased power requirements are limited by the power output of the propulsion system. Low power and part-power conditions may insufficiently generate heat for thermal management and energy conversion systems.

As such, there is a need for energy conversion systems that meet increased vehicle and propulsion system power generation requirements without limits from power outputs from the propulsion system. Additionally, there is a need for energy conversion and thermal management systems that can meet the challenges associated with increased thermal loads.

BRIEF DESCRIPTION

Aspects and advantages of the invention will be set forth in part in the following description, or may be obvious from the description, or may be learned through practice of the invention.

An aspect of the present disclosure is directed to a system for energy conversion. The system for energy conversion includes a propulsion system including a compressor section, a heat addition system, and an expansion section in serial flow arrangement. A fuel circuit is in fluid communication from a fuel tank to a fuel flow control device. The fuel flow control device separates a flow of fuel from the fuel tank into a first portion of fuel and a second portion of fuel. The fuel circuit is configured to provide the first portion of fuel to the heat addition system. A combustion device is configured to receive a flow of oxidizer from the compressor section via a fluid circuit. The fuel circuit is in fluid communication to provide the second portion of fuel to the combustion device. The combustion device is configured to generate combustion gases from the second portion of fuel and the flow of oxidizer. The fluid circuit is in fluid communication from the combustion device to flow the combustion gases to the propulsion system. A turbine configured to receive the combustion gases from the combustion device via the fluid circuit. A load device is operably coupled to the turbine via a driveshaft. The load device is configured to receive an output torque from the driveshaft via expansion of the combustion gases through the turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 4-7 are exemplary schematic embodiments of an energy conversion and thermal management system in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a propulsion system, vehicle, and energy conversion system are provided herein that may improve overall system and vehicle efficiency, such as through utilizing relatively small amounts of bleed air or other oxidizer from a propulsion system or auxiliary power unit to generate combustion gases from a combustion system separate from a combustion system at the propulsion system or auxiliary power unit. The combustion gases then expand through a power turbine to generate an output torque for a load device. A fuel-air heat exchanger is positioned in thermal communication with at least a portion of the flow of fuel. The combustion gases generated via the dedicated combustion system, separate from the propulsion system combustion system, allow for heat generation and release that is substantially de-coupled from power output or engine speed from the propulsion system. Certain embodiments include receiving a flow of oxidizer from the propulsion system and generating and expanding combustion gases at the combustion device and turbine separate from the propulsion system. Still certain embodiments include thermal communication of the combustion gases with one or more heat exchangers.

Embodiments of the energy conversion and thermal management system provided herein allow for weight-advantaged systems and methods for fuel heating and controlling fuel temperature independent of engine speed from the propulsion system. Embodiments of the systems may include unexpectedly beneficial results from having a combustion system and turbine separate from the propulsion system to generate fuel heating and power generation for a load device, such as an electric machine, an accessory gear assembly, pumps, mechanical loads generally, or other systems conventionally powered mechanically, electrically, or pneumatically by propulsion system.

Figure 1:
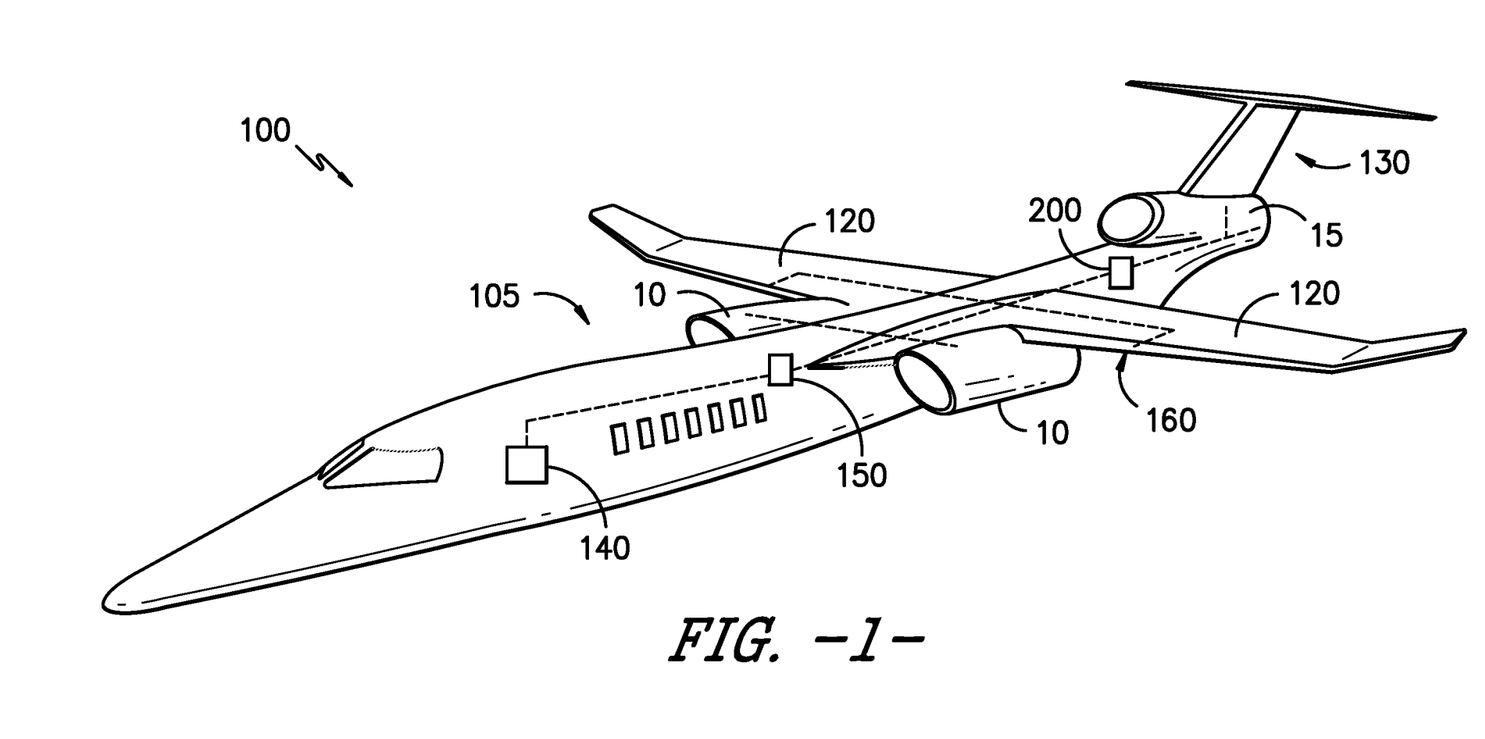
FIG. 1 is an exemplary embodiment of a vehicle including a propulsion system and energy conversion system according to aspects of the present disclosure.

Referring now to the drawings, in FIG. 1, an exemplary embodiment of a vehicle 100 including a propulsion system 10 and an energy conversion system 200 according to aspects of the present disclosure is provided. In an embodiment, the vehicle 100 is an aircraft including an aircraft structure or airframe 105. The airframe 105 includes a fuselage 110 to which wings 120 and an empennage 130 are attached. The propulsion system 10 according to aspects of the present disclosure is attached to one or more portions of the airframe. In certain embodiments, the vehicle 100 includes an auxiliary power unit (APU) 15. The APU 15 may form a gas turbine engine including a compressor section, a heat addition system, an expansion section, and an exhaust section such as further described herein. In various embodiments, the energy conversion system 200 is a system configured to desirably distribute thermal loads, such as to add or remove heat from one or more fluids or structures, such as, but not limited to, oxidizer at the propulsion system, fuel, lubricant, hydraulic fluid, pneumatic fluid, or cooling fluid for an electric machine, electronics, computing system, environmental control system, gear assembly, or other system or structure.

In certain instances, the propulsion system 10 is attached to an aft portion of the fuselage 110. In certain other instances, the propulsion system 10 is attached underneath, above, or through the wing 120 and/or portion of the empennage 130. In various embodiments, the propulsion system 10 is attached to the airframe 105 via a pylon or other mounting structure. In still other embodiments, the propulsion system 10 is housed within the airframe, such as may be exemplified in certain supersonic military or commercial aircraft.

Various embodiments of the vehicle 100 include a computing system 140, such as avionics or other electronics or computing devices configured to control the vehicle 100 or the propulsion system 10. The vehicle 100 may further include an environmental control system (ECS) 150, such as to provide thermally conditioned air to a cabin of the vehicle, the computing system 140, a vehicle surface anti-icing system 160, a propulsion system anti-icing system, or other system of the vehicle 100 or propulsion system 10. In various embodiments such as described herein, the energy conversion system 200 may be configured to provide energy to one or more subsystems of the vehicle or propulsion system, such as described above and further herein. Further embodiments of the energy conversion system may be configured to provide thermally conditioned fluid to one or more of the systems described herein.

Figure 2:
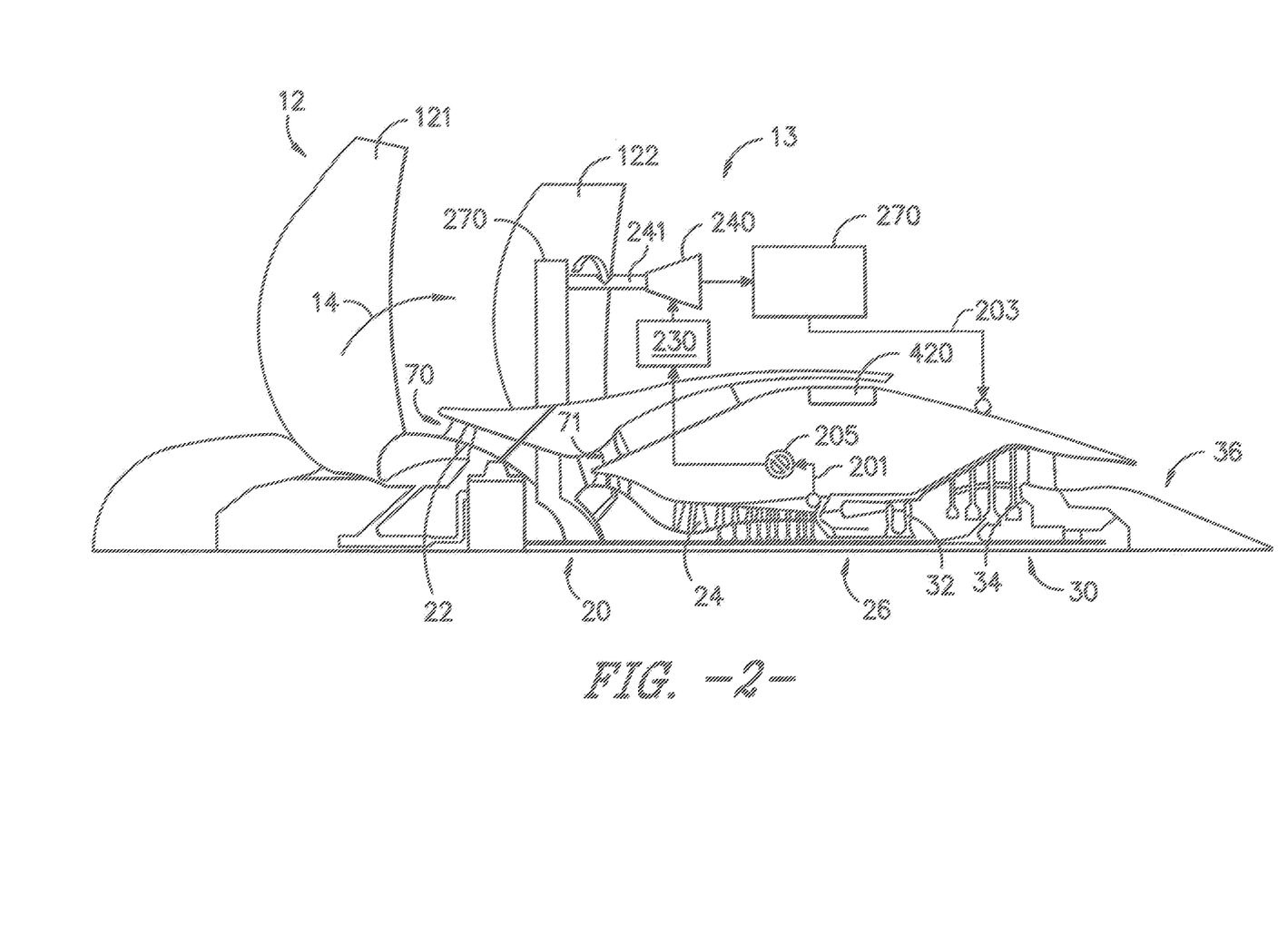
FIG. 2 is an exemplary schematic embodiment of an energy conversion system including a propulsion system in accordance with aspects of the present disclosure.

Referring now to FIG. 2, an exemplary schematic embodiment of an engine 13 for the propulsion system 10 or the APU 15 (FIG. 1) operably coupled to the energy conversion system 200 is provided. Particular embodiments of the propulsion system 10 may be configured as a turbomachine, a ramjet engine, or a scramjet engine. Still particular embodiments of the propulsion system 10 may include a turbomachine configured as a turbofan, turboprop, turbojet, turboshaft, propfan, or open rotor engine. In FIG. 2, the propulsion system 10 is configured as a three-stream engine including a fan bypass stream 14, a core flowpath 70, and a core bypass or third stream 71. Certain embodiments of the propulsion system 10 include a fan section 12, a compressor section 20, a combustion section or heat addition system 26, an expansion section 30, and an exhaust section 36 in serial flow arrangement. In various embodiments, the heat addition system 26 may be configured as a deflagrative combustion system or a detonative combustion system. The heat addition system 26 may include any suitable type of system for receiving a flow of liquid and/or gaseous fuel and generating hot gases, including, but not limited to, annular, can-annular, can, trapped vortex, volute or scroll, rotating detonation, pulse detonation, subsonic or supersonic combustion systems. The fan section 12 includes one or more stages of rotors and blades 121. Certain embodiments further include one or more stages of vanes that are stationary relative to a centerline axis of the propulsion system 10.

The compressor section 20, the heat addition system 26, and the expansion section 30 are positioned in serial aerodynamic flow arrangement. The compressor section 20, the heat addition system 26, and the expansion section 30 may together define a core engine or gas generator of the propulsion system 10. In certain embodiments, such as described herein, the compressor section 20 includes a high pressure compressor 24 positioned in direct serial flow arrangement with the heat addition system 26 and a high pressure turbine 32 of the expansion section 30. A low pressure turbine 34 of the expansion section 30 may be operably coupled to the fan section 12 to drive the one or more stages of the fan section 12. In certain embodiments, the propulsion system 10 may include a low pressure compressor or an intermediate pressure compressor 24 positioned aerodynamically between the fan section 12 and the high pressure compressor 24. In still further embodiments, an intermediate press turbine may be positioned aerodynamically between the high pressure turbine 32 and the low pressure turbine 34.

The core flowpath 70 is extended through at least the high pressure compressor 24, the heat addition system 26, and the high pressure turbine 32. The core bypass or third stream flowpath 71 is extended from downstream of the intermediate or low pressure compressor 22 and bypasses the core flowpath 70 at the high pressure compressor 24. In certain embodiments, the third stream flowpath 71 is in fluid communication with the fan bypass stream 14 downstream of the vanes 122.

The third stream flowpath 71 is an air stream configured to recover fluid energy to produce a portion of total thrust of the propulsion system 10. In one embodiment, the portion of total thrust produced through the third stream flowpath 71 may include a dedicated exhaust nozzle at an outlet end. In another embodiment, the portion of total thrust produced through the third stream flowpath 71 may be mixed with the fan bypass stream 14. In still another embodiment, the portion of total thrust produced through the third stream flowpath 71 may be mixed with the core flowpath 70 downstream of the heat addition system 26, and egressed through the exhaust section 36. Various embodiments of the third stream flowpath 71 are configured to generate less than 50% of the total thrust of the propulsion system 10.

It should be appreciated by those skilled in the art that the third stream flowpath 71 is extended from the core flowpath 70 upstream of the heat addition system 26 and downstream of the fan section 12, and is further configured to allow the flow of air to egress the propulsion system 10 to generate a portion of the total thrust of the propulsion system 10. The operating temperature of the air through the third stream flowpath 71 may generally correspond to a range of air temperatures as egressed from the intermediate or low pressure compressor 22.

Referring now to FIGS. 3-7, the energy conversion system 200 includes a pipe, manifold, or other walled conduit forming a fluid circuit 210 providing fluid communication of a flow of oxidizer 201, or air specifically, extracted from the compressor section 20 of the engine 13. In particular embodiments, the flow of oxidizer 201 is bled or otherwise directed from a portion of the oxidizer compressed by a compressor assembly 220. In a particular embodiment, the flow of oxidizer 201 is extracted from one or more stages of the high pressure compressor 24 of the engine 13 (FIG. 2). However, it should be appreciated that certain embodiments of the system 200 may receive the flow of oxidizer from the intermediate pressure compressor or low pressure compressor 22 (FIG. 2). Still further embodiments may receive the flow of oxidizer 201 from a dedicated compressor separate from the compressor section 20 of the propulsion system 10. A flow control device 205, such as a valve or other appropriate control mechanism, may desirably adjust or modulate an amount or magnitude of flow of oxidizer extracted from the compressor section 20.

The fluid circuit 210 is configured to provide fluid communication of the flow of oxidizer 201 from the compressor section 20 to a combustion device 230. The combustion device 230 may be any appropriate type of deflagrative or detonative combustion device configuration. Embodiments may include, but are not limited to, an annular combustor, a can combustor, a can-annular combustor, a trapped vortex combustor (TVC), an involute or scroll combustor, a rich burn combustor, a lean burn combustor, a pulse detonation combustor, a rotating detonation combustor, or combinations thereof, or other appropriate type of deflagrative or detonative combustion system.

In a particular embodiment, the flow control device 205 may limit, regulate, or control the flow of oxidizer 201 received by the combustion device 230 such that the flow is steady or otherwise within a particular or desired parameter range. The desired parameter range may be a particular flow rate or pressure, or combinations thereof, of oxidizer 201 provided to the combustion device 230. The flow control device 205 may generally allow for combustion within desired operational limits. Such limits may include emissions or greenhouse gases (e.g., oxides of nitrogen, smoke, unburned hydrocarbons, carbon dioxide, carbon monoxide, etc.). Limits may additionally, or alternatively, include those associated with lean blow out, rich blow out, re-light, combustion stability, pressure oscillations, acoustics, or other performance or operability parameters for combustion systems.

It should further be appreciated that the flow control device 205 may allow for stable operation of the combustion device 230 configured as a detonation combustor. The flow control device 205 may provide the flow of oxidizer 201 within ranges of pressure and/or flow rate particular for operation of the combustion device 230 as a detonation combustor. The combustion device 230 configured as a detonation combustor may further provide improvements to energy and thermal efficiency over deflagrative combustor configurations. Additionally, the combustion device 230 may be configured within operational ranges suitable for driving a turbine 240 different from operation of the heat addition system 26 and the expansion section 30 at the propulsion system 10. For instance, the system 200 may be configured to operate the combustion device 230 within operational ranges or steady state that are more narrow than those for the propulsion system 10. In another instance, propulsion systems 10, such as for aircraft, are generally configured for ranges of operating conditions corresponding to a landing-takeoff cycle for an aircraft. In contrast, the flow control device 205 may be configured to provide the flow of oxidizer 201 to the combustion device 230 within operational ranges that obviate issues related to transient operation or differences from relatively low power output (e.g., light-off, idle) to relatively high power output (e.g., takeoff). Additionally, or alternatively, the compressor assembly 220 may be of the APU 15. The APU 15 may generally be configured to operate at relatively steady-state operation, such as described above. Still other embodiments may receive the flow of oxidizer 201 from a compressor or pump separate from the aerodynamic or thermodynamic flowpath of the propulsion system 10 or the APU 15. Such embodiments include the compressor section forming an air compressor driven by an electric machine.

The system 200 further includes a pipes, manifolds, or walled conduits forming a fuel circuit 310 extended in fluid communication from a fuel tank 300. The fuel tank 300 contains a liquid and/or gaseous fuel for mixing and combustion/detonation at the combustion device 230. The fuel circuit 310 is configured to provide a flow of fuel, depicted schematically via arrows 302, to the combustion device 230. In a particular embodiment, the fuel tank 300 is furthermore in fluid communication with the heat addition system 26 of the engine 13 to provide a flow of liquid and/or gaseous fuel, depicted schematically via arrows 305, for generating combustion gases to expand at the expansion section 30.

In certain embodiments, the system 200 includes a fuel flow control device 307 configured to provide a first portion of fuel, depicted schematically via lines 303, toward the heat addition system 26 of the engine 13, and a second portion of fuel, depicted schematically via lines 304, toward the combustion device 230. The fuel flow control device 307 may form a valve, a flow divider, or other appropriate mechanism for separating the flow of fuel 301 into the first portion 303 and the second portion 304. In some embodiments, a fuel control device 307 is configured to control an amount or quantity of the second portion of fuel 304 provided to the combustion device 230. In certain embodiments, the fuel control device 307 at least partially determines an output energy of the of the combustion gases 202 to the turbine 240, such as by adjusting or modulating the amount of fuel provided to and combusted/detonated at the combustion device 230. In a particular embodiment, the flow control device 205 (FIG. 2) furthermore determines an output energy of the combustion gases 202 to the turbine 240, such as by adjusting or modulating the amount of oxidizer provided to and mixed with the fuel 302 for combustion/detonation at the combustion device 230.

During operation, the combustion device 230 generates combustion gases 202 and provides the combustion gases 202 to drive the turbine 240. The turbine 240 is operably coupled to a load device 270 via a driveshaft 241. During operation, as the combustion gases 202 expand through the turbine 240, the turbine generates an output torque and provides power to the load device 270 via transmission through the driveshaft 241. The load device 270 may include one or more fuel pumps, electric machines (e.g., motors and/or generators, constant frequency or variable frequency machines, hybrid powertrains, etc.), lubricant pumps, hydraulic pumps, air compressors, engine starter, sensor drives (e.g., one or more sensor devices, instrumentation sensors, or telemetry, including, but not limited to, transducers, capacitors, slip rings, thermocouples, electronic measurement devices, or computing systems), and auxiliary gearbox drives, or combinations thereof.

Figure 3:
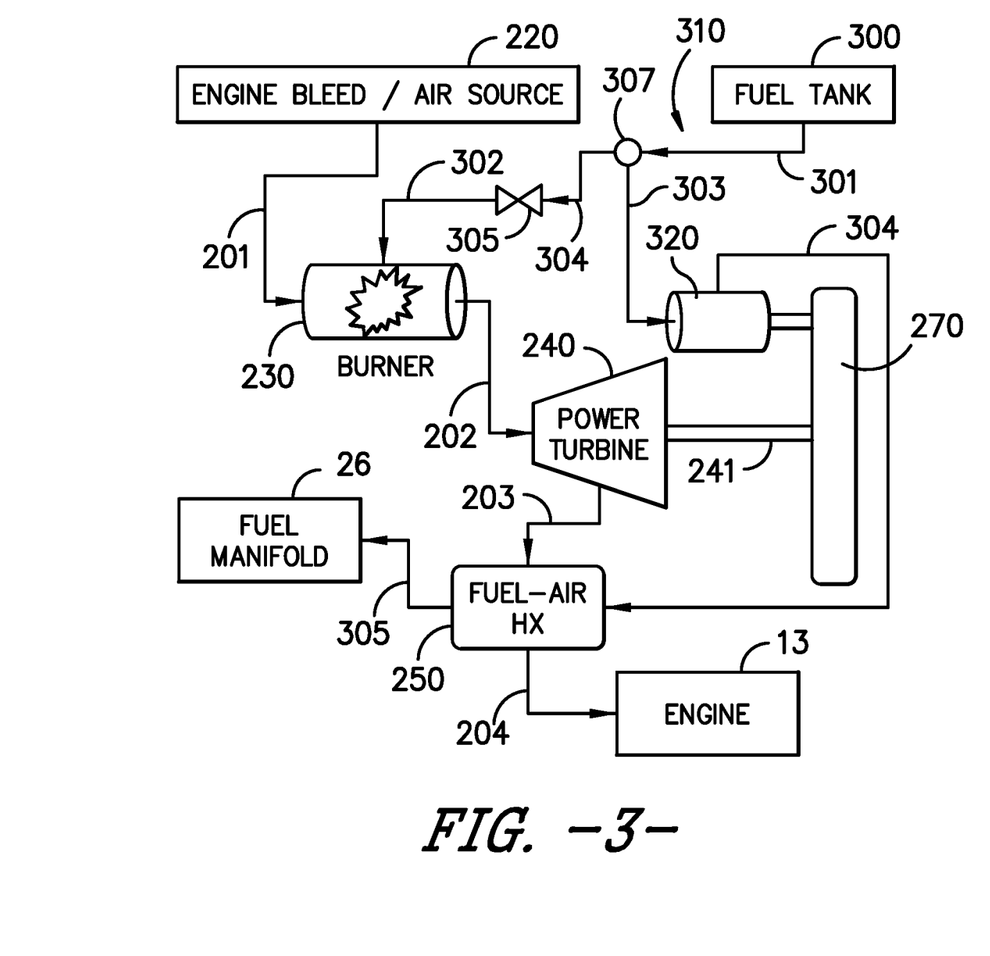
FIG. 3 is an exemplary schematic embodiment of an energy conversion system in accordance with aspects of the present disclosure.

The expanded combustion gases, depicted schematically via lines 203, egress from the turbine 240 are provided to the engine 13. Referring to FIGS. 2-3, in certain embodiments, the combustion gases provided to the engine 13 are particularly provided to the core flowpath 70. In one embodiment, the combustion gases are provided from the turbine 240 to the core flowpath 70 at the exhaust section 36 of the engine 13. In another embodiment, the combustion gases are provided from the turbine 240 to the core flowpath 70 at the expansion section 30 of the engine 13. In a still particular embodiment, the combustion gases are provided from the turbine 240 to the core flowpath at the intermediate pressure turbine or low pressure turbine 34 at the expansion section 30 of the engine 13. In still other embodiments, the flow of combustion gases 204 is provided to one or more of the fan stream 14 or the third stream flowpath 71.

In a particular embodiment, the second portion of fuel, depicted schematically via lines 304, is provided into thermal communication with the flow of combustion gases 203 egressed from the turbine 240 via a fuel-air heat exchanger 250. The fluid is generally an oxidizer, such as the flow of air through the propulsion system 10. In one embodiment, the fuel-air heat exchanger 250 is configured to transmit heat or thermal energy from the flow of combustion gases 203 downstream of the turbine 240 to the flow of fuel 304 upstream of the heat addition system 26. The cooled flow of combustion gases, depicted schematically via lines 204, is provided from the fuel-air heat exchanger 250 to the engine 13, such as described above. The heated flow of fuel, depicted schematically via lines 305, is provided from the fuel-air heat exchanger 250 to the heat addition system 26 of the engine 13.

In certain embodiments, a deoxygenator 320 is positioned in flow arrangement along the fuel circuit 310. The deoxygenator 320 is configured to remove oxygen from the second portion of fuel 303. In an embodiment, the deoxygenator 320 receives energy or motive force from the load device 270. The energy may be provided from the load device 270 via a shaft, electric energy, or other appropriate method for energy transmission. The deoxygenated flow of fuel is provided downstream to the fuel-air heat exchanger 250.

Figure 4:
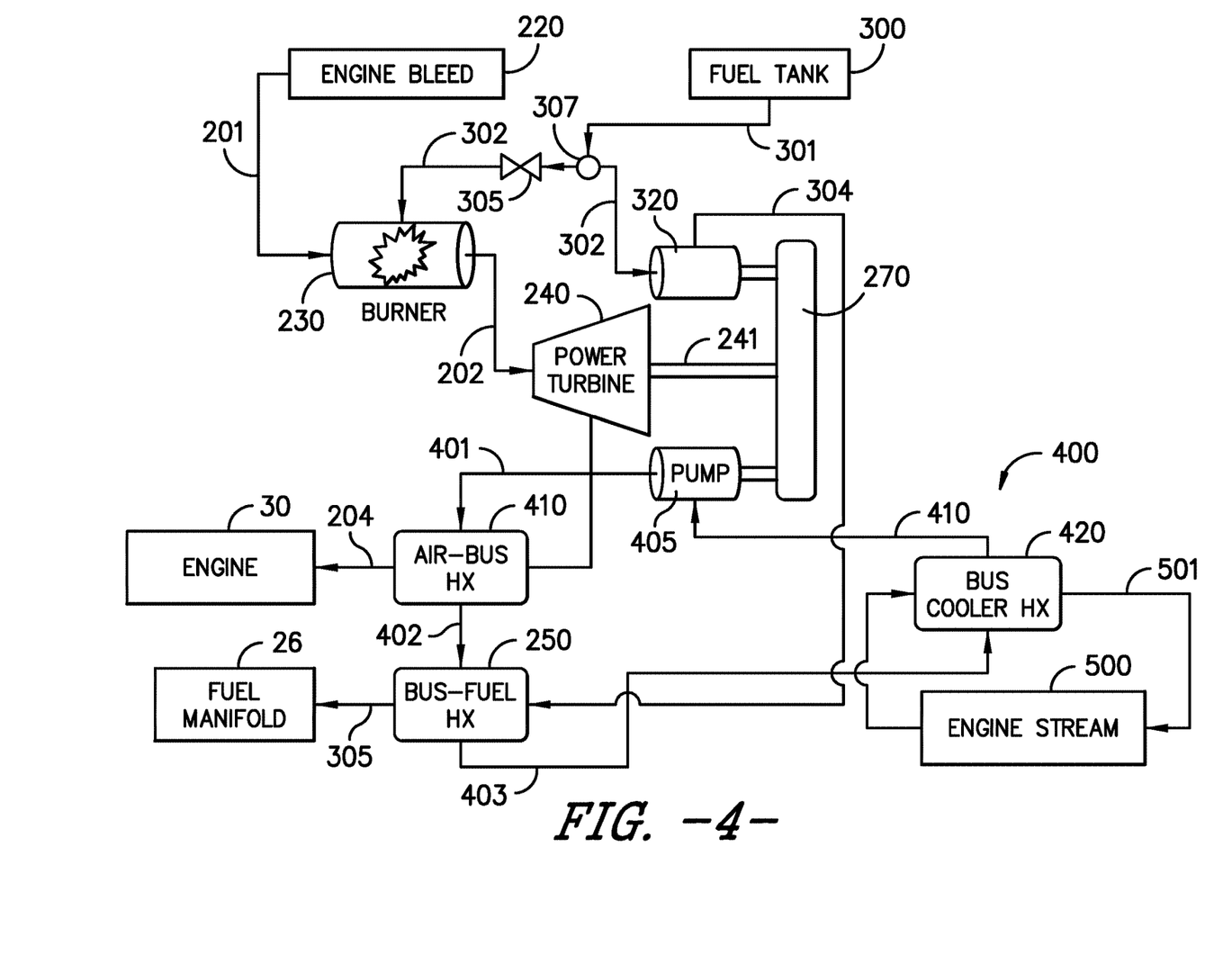

Referring now to FIG. 4, the system 200 is configured substantially similarly as depicted and described in FIGS. 2-3. In the embodiment depicted in FIG. 4, the energy conversion system 200 further includes a thermal management system 400 including a walled conduit forming a heat transfer fluid circuit 410 configured to provide a heat transfer fluid in thermal communication with the flow of combustion gases 203 egressed from the turbine 240. In FIG. 4, the fuel-air heat exchanger 250 provides the combustion gases 203 received from the turbine 240 in thermal communication with a flow of heat transfer fluid, depicted schematically via lines 401, received from a heat transfer fluid flow device 405. In various embodiments, the flow device 405 is operably coupled to and driven by the load device 270, such as described with regard to the deoxygenator 320.

The thermal management system 400 is further configured to provide the heat transfer fluid, depicted schematically via lines 402, in thermal communication with the second portion of fuel 304 via a first thermal bus heat exchanger 410. The heat exchanger 410 is configured to heat the flow of fuel 304 by receiving heat or thermal energy from the flow of heat transfer fluid 402. The flow of heat transfer fluid 402 receives heat or thermal energy from the flow of combustion gases 203 egressed from the turbine 240.

In various embodiments, the heat transfer fluid is a lubricant (e.g., oil, oil-based fluid, synthetic oil, polyalphaolefin, polyalphaolefin-based fluids, etc., or combinations thereof), a liquid and/or gaseous fuel (e.g., hydrocarbon fuels, fuel oils, aviation turbine fuels, or other appropriate propulsion system fuels), a supercritical fluid (e.g., supercritical carbon dioxide, water, methane, ethane, propane, ethylene, propylene, methanol, ethanol, acetone, nitrous oxide, or other appropriate substance at a temperature and pressure above its end point of a phase equilibrium curve), a silicone or silicone-based heat transfer fluid (e.g., a polydimethylsiloxane-based fluid, such as Syltherm™, or similar fluid), or other appropriate heat transfer fluid.

In some embodiments, the system 200 further includes a second thermal bus heat exchanger 420 positioned in thermal communication with the heat transfer fluid, such as depicted schematically via lines 403. The second heat exchanger 420 provides thermal communication between the flow of heat transfer fluid 403 and a flow of cooling fluid 501 provided by an engine cooling flow 500. The engine cooling flow 500 is a flow of relatively cool oxidizer from the engine 13, such as a flow of oxidizer at the fan stream 14 or the third stream flowpath 71 (FIG. 2). The second heat exchanger 420 is configured to remove thermal energy or heat from the flow of heat transfer fluid 403 and transmit the heat or thermal energy to the flow of cooling fluid 501. The cooled flow of heat transfer fluid, depicted schematically via lines 404, is provided to the fuel-air heat exchanger 250, such as to provide cooling to the flow of combustion gases 203. The cooled flow of combustion gases 204 is provided to the engine 13, such as for cooling one or more components of the intermediate pressure turbine or low pressure turbine 34, or as an active clearance control system.

Figure 5:
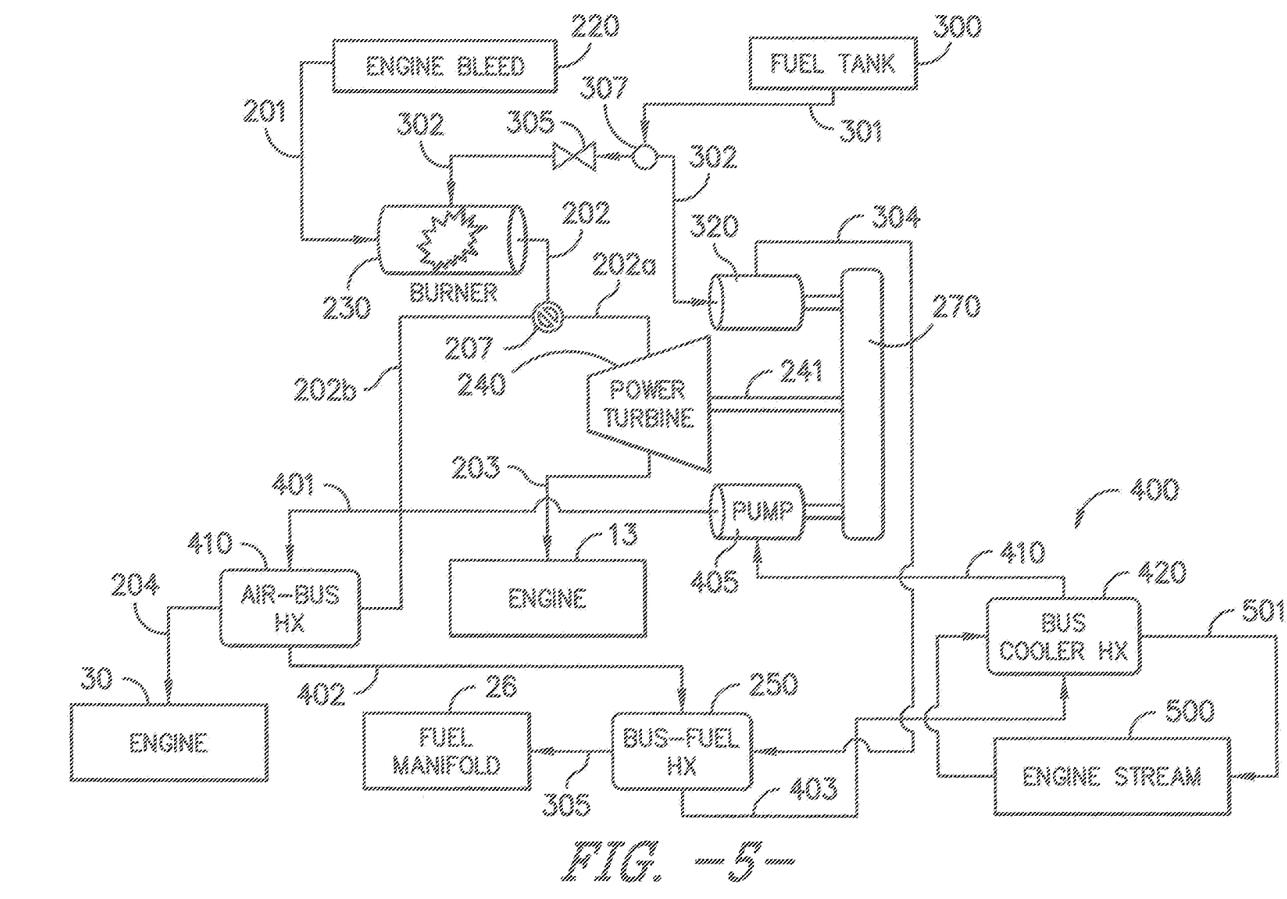

Referring now to FIG. 5, the system 200 is configured substantially similarly as described in regard to FIG. 4. In FIG. 5, the system 200 further includes a combustion gases flow control device 207 configured to divide the flow of combustion gases 202 into a first portion 202a provided to the turbine 240 and a second portion 202b bypassing the turbine 240. The first portion of combustion gases 202a expands through the turbine 240. As energy is released through the turbine 240, the expanded combustion gases 203 are cooler relative to the combustion gases 202. The relatively cooler, expanded combustion gases 203 are provided to one or more appropriate modules, components, or sub-systems at the engine 13, such as may utilize a relatively low pressure cooling fluid.

The bypassed flow of combustion gases 202b provides a relatively higher pressure flow in contrast to the flow of combustion gases 203 egressed from the turbine 240. The bypassed flow of combustion gases 202b is provided in thermal communication with the fuel-air heat exchanger 250, such as described above. The cooled flow of combustion gases 204 is provided to one or more portions of the expansion section 30 such as described above.

In particular embodiments, the flow control device 207 and the turbine 240 are integrated as a variable area turbine nozzle (VATN). The flow control device 207 and the turbine 240 together defining the VATN are together configured to control mass flow into or through the turbine 240. In one embodiment, the flow control device 207 is a variable area structure, such as a variable area nozzle, at an inlet of the turbine 240. However, in other embodiments, the flow control device 207 is a separate flow control structure configured to adjust or modulate mass flow through the turbine 240. In certain embodiments, the turbine 240 is downstream of the flow control device 207.

Figure 6:
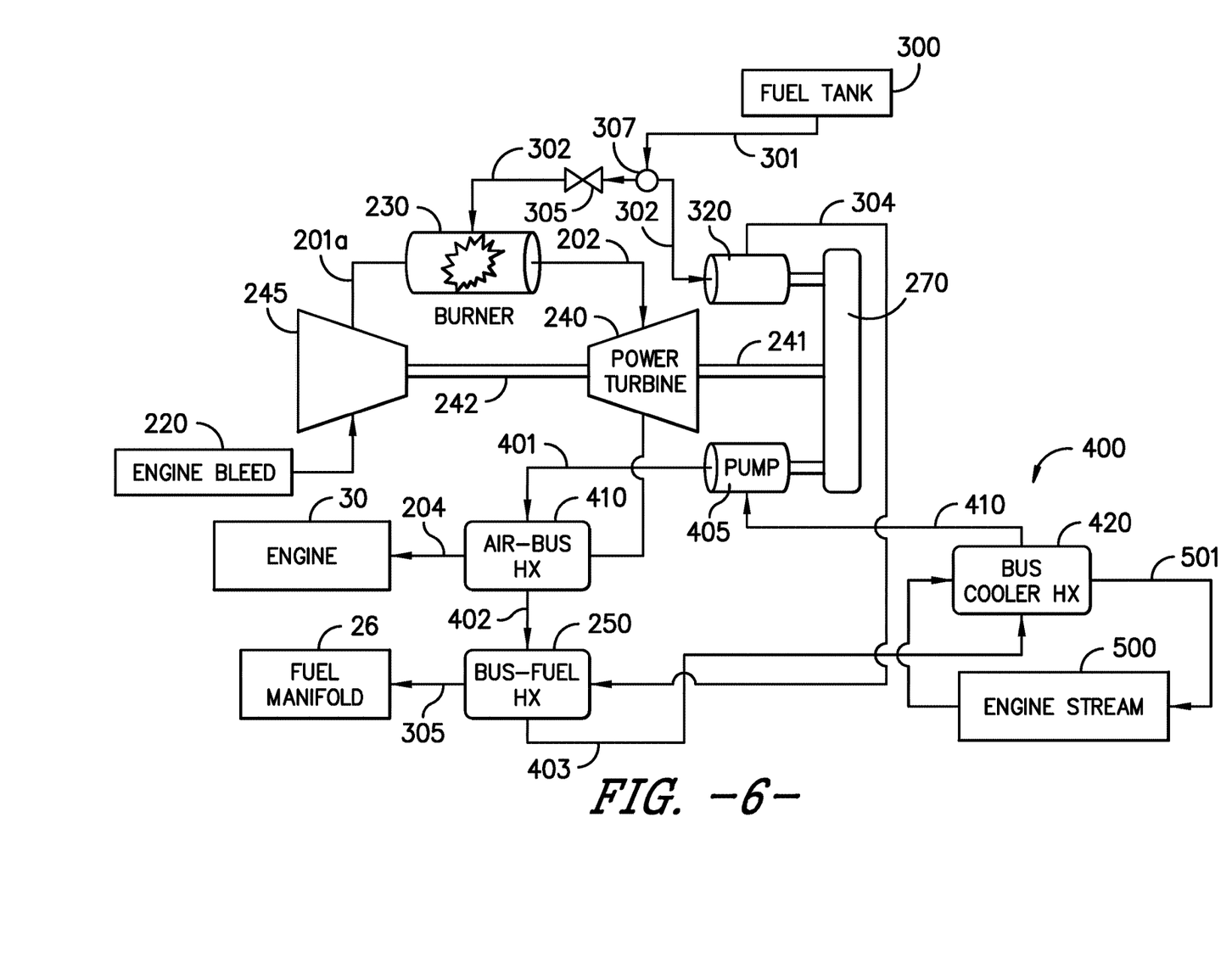

Referring now to FIG. 6, the embodiments of the system 200 provided are configured substantially similarly as described with regard to FIGS. 1-4. In FIG. 6, the turbine 240 is further connected to a compressor 245 via a driveshaft 242. The flow of oxidizer 201 is received from the compressor section 220 such as described above. The compressor 245 further compresses or energizes the flow of oxidizer 201 before providing the compressed flow of oxidizer, depicted schematically via arrows 201a, to the combustion device 230. In such embodiments, the compressor 245 operably coupled to the turbine 240 allows for a relatively lower pressure flow of oxidizer to be pulled from the compressor section 20 of the engine 13, such as from an intermediate or low pressure compressor 22, or from one or more forward or upstream stages of the high pressure compressor 24, in contrast to the high pressure compressor 24 generally, or one or more aft stages thereof. In other embodiments, the compressor 245 allows for a relatively low pressure flow of oxidizer to be received from a relatively lower pressure compressor or pump device.

Embodiments of the energy conversion system 200, propulsion system 10, or vehicle 100 provided herein may provide improved overall propulsion system and vehicle efficiency through improved systems, structures, or methods for energy conversion or thermal management such as provided herein. Embodiments provided herein include particular positioning, placement, and serial flows of fluids configured to improve overall system performance. One or more elements of the system, such as, but not limited to, the heat exchangers, circuits, conduits, flow devices, combustion devices, turbines, or compressors provided herein may be produced via one or more additive manufacturing methods described below. Still further, such systems may not have been possible without flowpaths, conduits, circuits, structures, or other details allowed by additive manufacturing methods. Furthermore, certain arrangements provided herein may produce beneficial and unexpected results via the transmission of heat or thermal energy to various fluids at particular junctions or serial flows such as provided herein.

One or more components of the propulsion system 10 and energy conversion system 200 described herein may be manufactured or formed using any suitable process, such as an additive manufacturing process, such as a 3-D printing process. The use of such a process may allow such components to be formed integrally, as a single monolithic component, or as any suitable number of sub-components, or at scales and intricacies not previously allowed or conceived in the art. In particular, the additive manufacturing process may allow such component to be integrally formed and include a variety of features not possible when using prior manufacturing methods. For example, the additive manufacturing methods described herein may allow for the manufacture of the combustion device 230 or one or more heat exchangers to a size, scale, and intricacy not previously conceived in the art. As another example, the additive manufacturing methods described herein may allow for the manufacture of the turbine 240 and a flow control device as a single, integral component. In further embodiments, the additive manufacturing methods described herein allow for the manufacture of the turbine, the flow control device(s), the combustion device, or circuits having unique features, configurations, thicknesses, materials, densities, fluid passageways, headers, and mounting structures that may not have been possible or practical using prior manufacturing methods. Additive manufacturing may allow for combinations of such structures, and their particular flow and thermal arrangements, that may allow for improved thermal efficiency, improved energy conversion, and improved overall propulsion system or vehicle efficiency or operability despite the addition of an additional combustion system, turbine, compressor, or heat exchangers.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. Suitable powder materials for the manufacture of the structures provided herein as integral, unitary, structures, or at scales and intricacies provided herein, include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A system for energy conversion, the system including a propulsion system including a compressor section, a heat addition system, and an expansion section in serial flow arrangement; a fuel circuit in fluid communication from a fuel tank to a fuel flow control device, wherein the fuel flow control device separates a flow of fuel from the fuel tank into a first portion of fuel and a second portion of fuel, wherein the fuel circuit is configured to provide the first portion of fuel to the heat addition system; a combustion device configured to receive a flow of oxidizer from the compressor section via a fluid circuit, wherein the fuel circuit is extended in fluid communication to provide the second portion of fuel to the combustion device, and wherein the combustion device is configured to generate combustion gases from the second portion of fuel and the flow of oxidizer, and further wherein the fluid circuit is in fluid communication from the combustion device to flow the combustion gases to the propulsion system; a turbine configured to receive the combustion gases from the combustion device via the fluid circuit; and a load device operably coupled to the turbine via a driveshaft, wherein the load device is configured to receive an output torque from the driveshaft via expansion of the combustion gases through the turbine.

2. The system of any one or more clauses herein, wherein the fluid circuit is in fluid communication from the combustion device to flow the combustion gases to the expansion section of the propulsion system.

3. The system of any one or more clauses herein, wherein the fluid circuit is in fluid communication from the combustion device to flow the combustion gases to a low pressure turbine of the expansion section of the propulsion system.

4. The system of any one or more clauses herein, the system including a fuel-air heat exchanger positioned along the fuel circuit in thermal communication with the first portion of fuel.

5. The system of any one or more clauses herein, wherein the fuel-air heat exchanger is positioned along the fluid circuit, wherein the fuel-air heat exchanger is configured to provide heat transfer between the combustion gases and the first portion of fuel.

6. The system of any one or more clauses herein, the system including a heat transfer fluid circuit configured to provide a flow of heat transfer fluid in thermal communication with the fuel-air heat exchanger, wherein the fuel-air heat exchanger is configured to provide heat transfer between the first portion of fuel and the heat transfer fluid.

7. The system of any one or more clauses herein, the system including a first thermal bus heat exchanger configured to provide heat transfer between the heat transfer fluid and the combustion gases.

8. The system of any one or more clauses herein, the system including a second thermal bus heat exchanger configured to provide heat transfer between the heat transfer fluid and a flow of cooling fluid.

9. The system of any one or more clauses herein, wherein the flow of cooling fluid is a flow of compressed oxidizer generated by the compressor section of the propulsion system.

10. The system of any one or more clauses herein, the system including a deoxygenator positioned along the fuel circuit to receive the first portion of fuel.

11. The system of any one or more clauses herein, the system including an oxidizer flow control device positioned at the fluid circuit downstream of the compressor section and upstream of the combustion device, wherein the oxidizer flow control device is configured to modulate an amount of the flow of oxidizer provided to the combustion device.

12. The system of any one or more clauses herein, wherein the load device is one or more of a fuel pump, an electric machine, a lubricant pump, a hydraulic pump, an air compressor, an engine starter, a sensor drive, an auxiliary gearbox drive, or combinations thereof.

13. The system of any one or more clauses herein, wherein the combustion device is configured as a deflagrative combustion device.

14. The system of any one or more clauses herein, wherein the combustion device is configured as a detonative combustion device.

15. The system of any one or more clauses herein, the system comprising a fuel flow control device at the fuel circuit, wherein the fuel flow control device is configured to modulate the second portion of fuel provided to the combustion device.

16. The system of any one or more clauses herein, the system including a combustion gases flow control device positioned at the fluid circuit downstream of the combustion device, wherein the combustion gases flow control device separates the flow of combustion gases into a first portion of combustion gases in fluid communication with the turbine and a second portion of combustion gases in fluid communication with a thermal bus heat exchanger.

17. The system of any one or more clauses herein, wherein the thermal bus heat exchanger provides the second portion of combustion gases in thermal communication with heat transfer fluid at a heat transfer fluid circuit.

18. The system of any one or more clauses herein, wherein the second portion of combustion gases bypasses the turbine.

19. The system of any one or more clauses herein, wherein the combustion gases flow control device is integrated to the turbine as a variable area turbine nozzle.

20. The system of any one or more clauses herein, the system including a compressor operably coupled to the turbine via the driveshaft, wherein the compressor is configured to receive the flow of oxidizer from the compressor section upstream of the combustion device.

21. A system for energy conversion, the system including a propulsion system including a compressor section, a heat addition system, and an expansion section in serial flow arrangement; a fuel circuit in fluid communication from a fuel tank to a fuel flow control device, wherein the fuel flow control device separates a flow of fuel from the fuel tank into a first portion of fuel and a second portion of fuel, wherein the fuel circuit is configured to provide the first portion of fuel to the heat addition system; a combustion device configured to receive a flow of oxidizer directly from the compressor section via a fluid circuit, wherein the fuel circuit is in fluid communication to provide the second portion of fuel to the combustion device, and wherein the combustion device is configured to generate combustion gases from the second portion of fuel and the flow of oxidizer, and further wherein the fluid circuit is in fluid communication from the combustion device to flow the combustion gases to the propulsion system; a turbine configured to receive the combustion gases from the combustion device via the fluid circuit; and a load device operably coupled to the turbine via a driveshaft, wherein the load device is configured to receive an output torque from the driveshaft via expansion of the combustion gases through the turbine.

22. A system for energy conversion, the system including a propulsion system including a compressor section, a heat addition system, and an expansion section in serial flow arrangement; a fuel circuit in fluid communication from a fuel tank to a fuel flow control device, wherein the fuel flow control device separates a flow of fuel from the fuel tank into a first portion of fuel and a second portion of fuel, wherein the fuel circuit is configured to provide the first portion of fuel to the heat addition system; a combustion device configured to receive a flow of oxidizer from the compressor section via a fluid circuit, wherein the fuel circuit is in fluid communication to provide the second portion of fuel to the combustion device, and wherein the combustion device is configured to generate combustion gases from the second portion of fuel and the flow of oxidizer, and further wherein the fluid circuit is in fluid communication from the combustion device to flow the combustion gases to the propulsion system; a turbine configured to receive the combustion gases from the combustion device via the fluid circuit; and a load device operably coupled to the turbine via a driveshaft, wherein the load device is configured to receive an output torque from the driveshaft via expansion of the combustion gases through the turbine; and a fuel-air heat exchanger positioned along the fuel circuit in thermal communication with the first portion of fuel.

What is claimed is:

1. A system for energy conversion, the system comprising:
   a propulsion system comprising a compressor section, a heat addition system, and an expansion section in serial flow arrangement;
   a fuel circuit in fluid communication with a fuel tank and a fuel flow control device, wherein the fuel flow control device separates a flow of fuel from the fuel tank into a first portion of fuel and a second portion of fuel, and wherein the fuel circuit is configured to provide the first portion of fuel to the heat addition system;
   a combustion device configured to receive a flow of oxidizer from the compressor section via a fluid circuit, wherein the fuel circuit is in fluid communication with the combustion device to provide the second portion of fuel, and wherein the combustion device is configured to generate combustion gases from the second portion of fuel and the flow of oxidizer, and further wherein the fluid circuit is in fluid communication with the combustion device to flow the combustion gases to the propulsion system;
   a turbine configured to receive the combustion gases from the combustion device via the fluid circuit wherein combustion gases exiting the turbine are returned to the propulsion system via the fluid circuit;
   a load device operably coupled to the turbine via a driveshaft, wherein the load device is configured to receive an output torque from the driveshaft via expansion of the combustion gases through the turbine;
   a heat transfer fluid circuit configured to provide a flow of heat transfer fluid in thermal communication with a fuel-air heat exchanger and in thermal communication with a first thermal bus heat exchanger,
   the first thermal bus heat exchanger positioned along the fluid circuit between the turbine and the propulsion system in thermal communication with the combustion gases exiting the turbine and the heat transfer fluid wherein the first thermal bus heat exchanger is configured to provide heat transfer between the heat transfer fluid and the combustion gases; and
   the fuel-air heat exchanger positioned along the fuel circuit in thermal communication with the first portion of fuel and the heat transfer fluid; wherein the fuel-air heat exchanger is configured to provide heat transfer between the first portion of fuel and the heat transfer fluid.

2. The system of claim 1, wherein the fluid circuit is in fluid communication with the combustion device and the expansion section of the propulsion system, and wherein the fluid circuit provides the flow of combustion gases from the combustion device to the expansion section.

3. The system of claim 2, wherein the fluid circuit is in fluid communication from the combustion device to a low pressure turbine of the expansion section of the propulsion system.

4. The system of claim 1, the system comprising: a second thermal bus heat exchanger configured to provide heat transfer between the heat transfer fluid and a flow of cooling fluid.

5. The system of claim 1, the system comprising: a second thermal bus heat exchanger configured to provide heat transfer between the heat transfer fluid and a flow of cooling fluid.

6. The system of claim 1, the system comprising: a deoxygenator positioned along the fuel circuit to receive the first portion of fuel.

7. The system of claim 1, the system comprising: an oxidizer flow control device positioned at the fluid circuit downstream of the compressor section and upstream of the combustion device, wherein the oxidizer flow control device is configured to modulate an amount of the flow of oxidizer provided to the combustion device.

8. The system of claim 1, wherein the load device is one or more of a fuel pump, an electric machine, a lubricant pump, a hydraulic pump, an air compressor, an engine starter, a sensor drive, an auxiliary gearbox drive, or combinations thereof.

9. The system of claim 1, wherein the combustion device is configured as a deflagrative combustion device.

10. The system of claim 1, wherein the combustion device is configured as a detonative combustion device.

11. The system of claim 1, the system comprising a fuel flow control device at the fuel circuit, wherein the fuel flow control device is configured to modulate the second portion of fuel provided to the combustion device.

12. The system of claim 1, the system comprising: a compressor operably coupled to the turbine via the driveshaft, wherein the compressor is configured to receive the flow of oxidizer from the compressor section upstream of the combustion device.

* * * * *